(No Model.)

L. C. KOHLER.
PNEUMATIC TRAVELER FOR PIPES OR CONDUITS.

No. 599,713. Patented Mar. 1, 1898.

Witnesses.

Inventor.
Louis C. Kohler
By Benedict & Morsell
Attorneys.

THE NORRIS PETERS CO., PHOTO-LITHO., WASHINGTON, D. C.

UNITED STATES PATENT OFFICE.

LOUIS C. KOHLER, OF MILWAUKEE, WISCONSIN.

PNEUMATIC TRAVELER FOR PIPES OR CONDUITS.

SPECIFICATION forming part of Letters Patent No. 599,713, dated March 1, 1898.

Application filed June 16, 1897. Serial No. 641,063. (No model.)

*To all whom it may concern:*

Be it known that I, LOUIS C. KOHLER, of Milwaukee, in the county of Milwaukee and State of Wisconsin, have invented a new and useful Improvement in Pneumatic Travelers for Pipes or Conduits, of which the following is a description, reference being had to the accompanying drawings, which are a part of this specification.

It is common in telegraph and telephone construction to lay pipes or construct conduits below the surface of streets in cities and elsewhere, through which the telegraph or telephone wires are carried, and to introduce these wires into the pipes or conduits, usually from one street-crossing to another, or for any distance, is a vexatious, tedious, and difficult task.

My invention is of a device which I call a "pneumatic traveler," which is adapted under pneumatic pressure, either by producing a vacuum in front of it or by compressed air acting on it at the rear, to travel or be forced through a pipe or conduit, even for a considerable distance, drawing with it a wire or cord attached thereto, thus taking the wire or cord through the pipe or conduit the entire length thereof or from one hand-hole therein to another hand-hole.

The invention consists of the device, its parts, and combinations of parts, as hereinafter described and claimed, or their equivalents.

Figure 1:
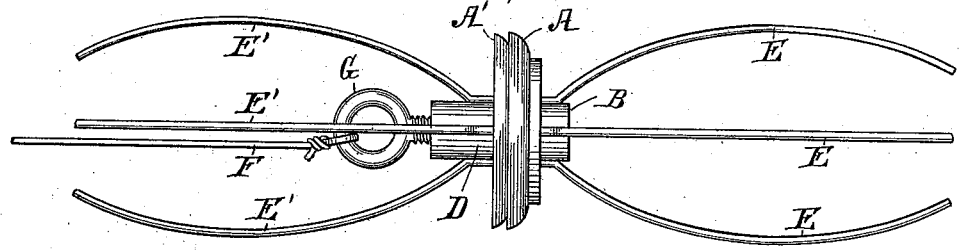
Figure 2:
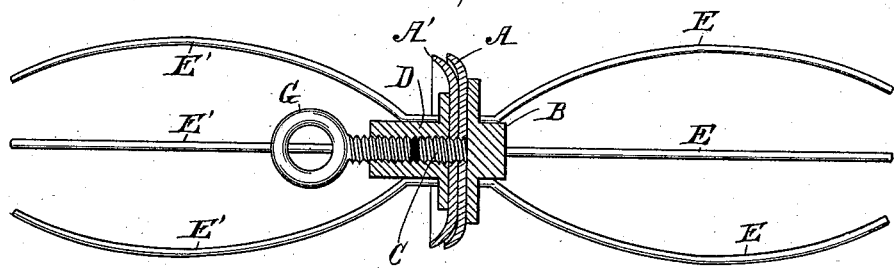
Figure 3:
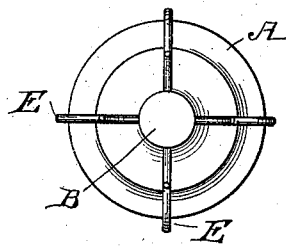
Figure 4:
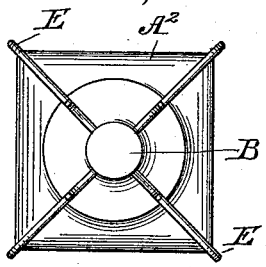
Figure 5:

In the drawings, Figure 1 is a perspective view of my improved device. Fig. 2 is a central longitudinal section of the same device. Fig. 3 is an end view of the device shown in Fig. 1. Fig. 4 is an end view of a modified form of the device. Fig. 5 is a detail of a guard or finger of a modified form of the device.

The pipes or conduits usually laid in the streets of cities for telephone, telegraph, or fire-alarm purposes are tubes of moderate diameter, and as my improved device, though adapted for use in pipes and conduits of every nature through which a wire, cord, or analogous article is to be drawn, is still more frequently and more largely in demand for use in such telegraph, telephone, or fire-alarm pipes I have shown a device of such form and size relatively as is adapted for such telephone, telegraph, or fire-alarm pipes or conduits.

One or more disks A A', preferably a plurality of these disks, is made of compact airtight flexible material, preferably of leather or sheet-rubber, substantially of such form as to conform to the interior or transverse plane of the pipe or conduit in which it is to be used and diametrically is of a size a little greater than the diameter of the pipe or tube. Against this disk or these disks, at one side, centrally, is placed a block or head-piece B of less diameter than the disk and of less diameter than the pipe or conduit in which the device is to be used. This head-piece B is provided with a screw or screw-threaded stem C, that passes substantially centrally through the disk or disks, and a block or tailpiece D on the other side of the disk or disks turns onto the screw-threaded stem C, against the disk or disks, opposite the head-piece B, and clamps them firmly in position and supports the disks centrally against bending over or deflecting between the head and tail blocks.

To guide the traveler and secure it in correct transverse position of the pipe or conduit while traveling through it, I provide a plurality of guides or fingers E and E', preferably both in front and at the rear of the disks A, which guides are secured to the head and tail blocks severally and project therefrom toward the front and toward the rear, respectively, expanding laterally, so as to bear against the wall of the pipe or conduit and prevent the tilting or displacement of the disk A relative to the pipe or conduit. These fingers are of elastic material and are conveniently made of steel wire inserted longitudinally in the blocks B and D, respectively, being so tightly fitted in the blocks as to be held in permanent position therein. These guides or fingers E E' are adapted to bear against and travel on the wall of the pipe or conduit, and, as will be understood, may project from the disk-blocks only toward the front or toward the rear; but preferably they are projected from the disk-blocks both toward the front and toward the rear. These fingers are preferably so formed as to curve or bulge outwardly to the greatest distance centrally of their respective lengths, being curved or turned inwardly somewhat at their ends to prevent the ends contacting with any projections in the pipe or conduit through which the traveler is passing. For conveniently attaching a wire or cord F to the traveler I provide an eyebolt G, the screw-threaded stem of which may turn into the screw-threaded aperture of the nut-like tail-block D.

In the drawings, Figs. 1 and 2, the disks A A' are shown as slightly recurved near their peripheries. It will be understood that this position of the disks is that which is assumed by the disks when inserted in a tube slightly smaller than the diameter of the disks, which causes them to deflect to the rear and produces a practically air-tight fit of the disks against the wall of the tube, though permitting of their movement freely along in the tube under pressure of air applied either as compressed air at the rear or by suction or vacuum effect in front.

In Fig. 4 the flexible disk $A^2$ is shown as square in form. This form is shown merely to indicate one of the many forms that the disk may be constructed in to make it conform to the shape of the pipe or conduit in which it is to be used.

When to be used in large conduits, the fingers E E', if made heavy and with considerable spreading or lateral strength, would bear so hard against the wall of the conduit as to cause considerable friction, and to reduce the friction in such case as much as possible the fingers may be provided with antifriction-wheels H, substantially in the form shown in Fig. 5, adapted to bear against and travel on the wall of the pipe or conduit.

As hereinbefore stated, the fingers E and E', preferably both at the front and at the rear of the disks A, are provided for guiding the traveler and securing it in proper transverse position; but, as will be understood from such statement and from the mechanical requirements of the device, the fingers E or E' may be omitted, the remaining fingers extending in one direction only being sufficient to guide and support the traveler where great strain on the traveler does not occur.

What I claim as my invention is—

1. A pneumatic traveler for a pipe or conduit, comprising a flexible disk or disks, a head-block and a tail-block of less diameter than the disk or disks between which blocks the disk or disks are clamped, and guides projecting from a block adapted to bear against the wall of the pipe or conduit in which the traveler is employed.

2. A pneumatic traveler for a pipe or conduit comprising a flexible disk or disks, a head-block and a tail-block of less diameter than the disk or disks between which blocks the disk or disks are clamped and guides porjecting and spreading from the blocks toward the front and toward the rear.

3. The combination of an air-tight flexible disk or disks, a head-block and a tail-block of less diameter than the disk or disks one on each side of the disk or disks centrally, a screw-threaded stem fixed to one of the blocks and turning into the other block whereby the blocks are clamped to each other and to the interposed disk or disks, guides projecting and spreading from the blocks, and means on the tail-block for attaching a wire thereto.

4. The combination of an air-tight flexible disk or disks, a head-block and a tail-block of less diameter than the disk or disks one on each side of the disk or disks centrally, means clamping the blocks to each other and against the interposed disk or disks, and a plurality of elastic guides projecting and spreading from one of the clamping-blocks, and adapted to bear against and travel on the pipe or conduit in which the traveler is used.

In testimony whereof I affix my signature in presence of two witnesses.

LOUIS C. KOHLER.

Witnesses:
ANNA V. FAUST,
ARTHUR L. MORSELL.